(No Model.)
O. ANDRÉ
SELF CLEANSING FILTER.
No. 502,690. Patented Aug. 1, 1893.
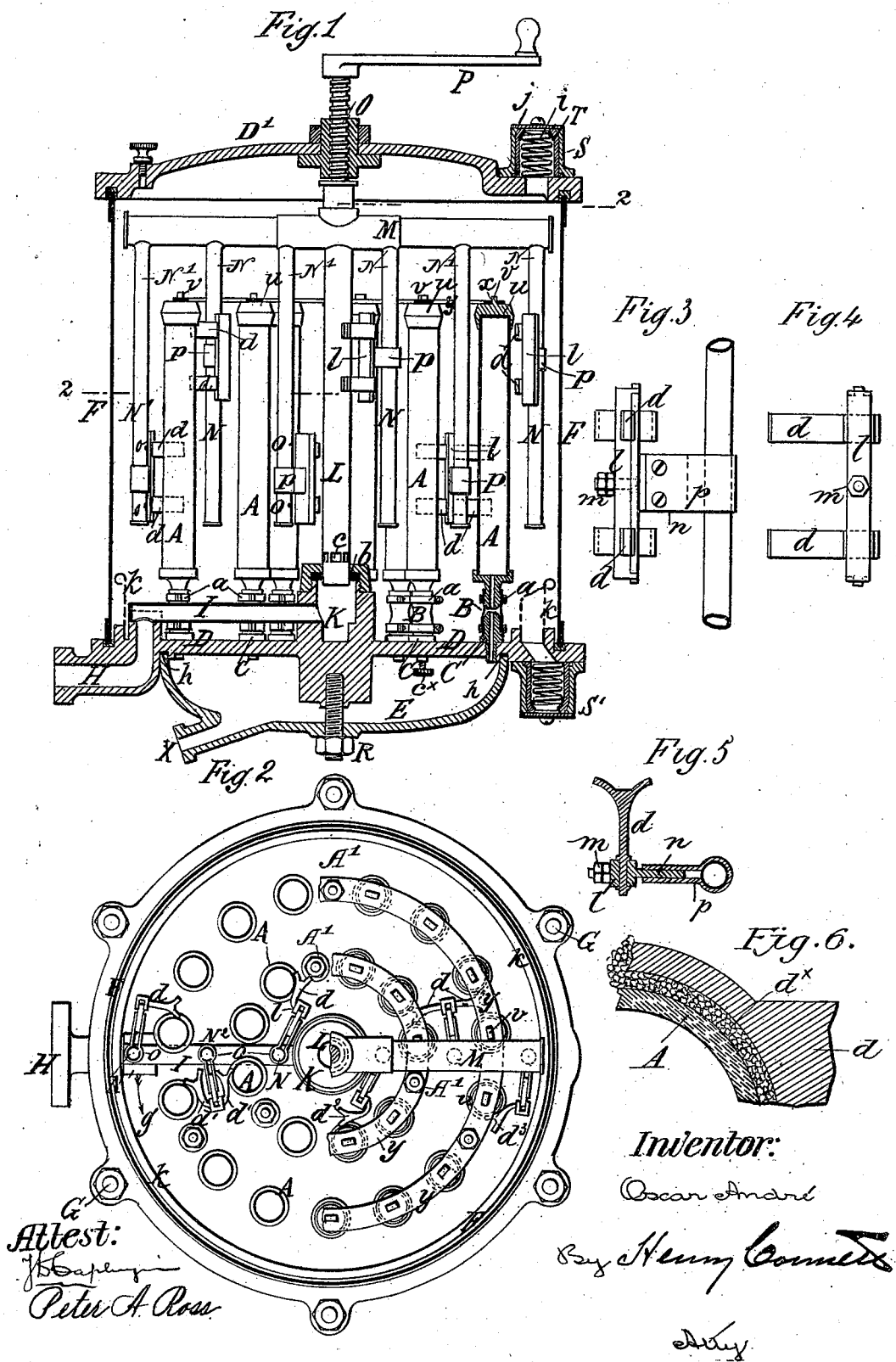
Inventor:
Oscar André
By Henry Connett
Atty
Attest:
J. H. Caplinger
Peter A. Ross

United States Patent Office.

OSCAR ANDRÉ, OF PARIS, FRANCE, ASSIGNOR TO THE SOCIÉTÉ DU NETTO-YEUR O. ANDRÉ APPLIQUÉ AU FILTRE CHAMBERLAND SYSTÉME PASTEUR, OF SAME PLACE.

SELF-CLEANSING FILTER.

SPECIFICATION forming part of Letters Patent No. 502,690, dated August 1, 1893.

Application filed March 25, 1892. Serial No. 426,395. (No model.) Patented in France November 26, 1890, No. 209,923.

*To all whom it may concern:*

Be it known that I, OSCAR ANDRÉ, a citizen of the French Republic, and a resident of Paris, (Seine,) France, have invented certain Improvements in Self-Cleansing Filters, (for which invention a patent has been granted in France, No. 209,923, dated November 26, 1890,) of which the following is a specification.

My present invention relates to the class of filtering apparatuses in which the filtration is effected by causing the unfiltered liquid to pass through the walls of porous earthenware cells, and in which means are provided for removing from the exterior surfaces of said cells, from time to time the deposit left thereon by the water, without the necessity of opening the filter. Filters belonging to this general class are illustrated in the patent to Chamberland, No. 336,089, of February 15, 1886, and in the patent granted to me, No. 418,148, dated December 31, 1889. In the Chamberland filter the elongated filtering bodies or cells are arranged in a series and rubbers or scrapers which embrace the several cells, are moved along the surfaces of the same by a screw operated from the exterior of the filter drum or casing, thus removing the sediment from the exterior surfaces of the cells. In the filter described in my Patent No. 418,148, the filtering cells are arranged in concentric series, and the sediment is removed by jets of water under pressure. The jet tubes are carried around by a rotating screw shaft in such a manner as to move in a spiral path.
I have found by experience that with the devices above named it is difficult to remove completely all the sediment on the porous filtering cells, and especially sediment of a muciloginous nature, and in order to perfect the filter so far as the mechanical cleansing is concerned, I provide my present filter, in addition to the jet-devices, moving in a spiral or helicoidal path, with scrapers which also move in a helicoidal path over the several porous cells in the series, as will be hereinafter explained. I also introduce into the filtering apparatus a quantity of finely granulated or powdered solid matter which will be of such density as to remain in suspension in the water. I prefer to use charcoal powder or sawdust. This powder or dust forms a filtering coating on the exterior surfaces of the porous filtering cells or bodies through which coating the liquid must pass before traversing the wall of the cell, and the impurities from the liquid will collect on this bed or coating, and the whole will be removed by the mechanical cleansers.

In order to facilitate the operation of the scrapers in cleaning the surfaces of the filtering cells, I employ pulverized cork which interposes between the scrapers and the filtering cells and serves to loosen and scrape off the accumulated coating on the same.

My invention will be more particularly described hereinafter and its novel features carefully defined in the claims.

In the accompanying drawings which serve to illustrate the invention—Figure 1 is a vertical mid-section of a filter embodying my improvements, and Fig. 2 is a transverse section thereof, taken in the planes indicated by the line 2, 2, in Fig. 1. Figs. 3, 4 and 5 are detached detail views, drawn to a larger scale than the principal figures and illustrating the construction of the scrapers. Fig. 6 is a view illustrating the function of the granulated cork.

F is an exterior drum or casing, which may be of metal, wood, or like material; this drum is provided with a base plate D and cover plate D' and these may be connected by rods G.

A, A, are porous filtering cells of tubular form arranged in concentric, circular series, as seen in plan, provided at their upper ends with caps u, and at their lower ends connected by rubber tubes B, with nipples C, which are set in apertures in the base plate D, and open into a receiver E, which has an outlet X. At their upper ends the cells A of each series are secured to a ring or hoop y, by means of studs or pins v, in their caps u. The rings y may be supported and held in position on rods or standards A', fixed at their bases in the plate D.

The upper lip or margin of the receiver E enters a packed recess h in the plate D, and is secured to the plate D by means of a screw R.

The flexible connecting tubes B, which are secured by clamps $a$ to the respective parts, avoid excessive rigidity in setting the cells A; this feature, however, I do not broadly claim herein, as it is shown in my former patent. Should one of the cells A be broken, or become defective, it will only be necessary to remove the receiver E and apply a stopper, as $c^x$, to the nipple C, as will be understood by inspection of Fig. 1.

The liquid enters the filter at an inlet H, formed in the base plate D, flows thence through a radial tube I, to a central chamber K, also formed in the plate D. From this chamber K it passes upward into a centrally arranged tubular or hollow spindle L, which is arranged to play or slide telescopically through a bearing $b$, in the chamber K, and escapes from said spindle L, under normal conditions, through ports $c$ in the latter.

Having described the filtering devices, I will now describe the mechanical cleansing mechanism.

Mounted on the top of tube L, and extending diametrically across the chamber in casing F above the series of cells A, is a transverse tube M, from which depend tubes N and N'. Where there are two concentric series of cells, as here shown, there will be, on each side of the central tube L, three pendent tubes, one within the inner series of cells, one between the two series, and one exterior to the outer series, or six pendent tubes in all, as clearly seen in Fig. 1. Fixed to the transverse tube M, and aligned with the spindle L, is a screw O, which screws through a nut in the cover plate D' and is furnished with a crank P. The nut in the cover, and the bearing $b$, below, provide the necessary end-bearings for the spindle L, and when the crank P, is turned, the rotary motion combined with the motion imparted by the screw O, causes the pendent tubes N and N' to move in a spiral or helicoidal path. The tubes N are provided with brackets $p$, secured to them at their upper ends or parts, and the tubes N' are provided with similar brackets secured to them at their lower ends; and to each of these brackets is secured a cross arm, $l$, bearing at its upper and lower extremities, respectively, a scraper $d$, of soft rubber or the like, which has forked extremities giving to the scraper, when seen in plan, somewhat the form of a Y. This scraper is seen in Figs. 3, 4 and 5, which are detail views of the scraper and bracket.

The scrapers $d$ bear on the surfaces of the cells A as seen in Fig. 2, the pendent tubes between the two series of cells carrying each two oppositely arranged scrapers, and those within the inner circle, and without the outer circles of cells, requiring only one.

In the walls of each tube N and N', adjacent to the point where the scrapers $d$ are mounted thereon, are jet apertures $o$, adapted to discharge against the adjacent cells A.

The tubes L and M, and the pendent tubes N and N', constitute a rotating carrier for the scrapers $d$, the pendent tubes forming the arms for said scrapers.

So far as described the operation is as follows: The filtering medium; charcoal dust, sawdust, &c., is placed in the filter and the liquid under pressure admitted at H. The filtering medium applies itself to the exterior surfaces of the cells A, and the liquid passes through this medium and the walls of the cells, the filtered liquid passing first into the receiver E and flowing off thence at the outlet X. The sediment from the liquid collects on the coating of filtering material, and in consequence the cells will, after a time, become so coated as to impede the filtering operation.

To cleanse or clean the surfaces of the cells, the operator turns the crank P in the direction of arrow $g$, which carries the spindle L to descend into the chamber K, when, almost at once, the ports $c$ will be closed and the liquid will pass through the spindle L, and transverse tube M, to the pendent tubes N, N', and jets will be forced through the apertures $o$ against the cells A. As the operator continues to turn the crank the scrapers $d$ will move down in a helicoidal path, rubbing over and lapping about the cells A in such a manner as to scrape the entire surface thereof. As the set of scrapers on the tubes N are arranged above those on the tubes N', and as the higher set of scrapers at one side (the right in Fig. 1) act on the outer surfaces of the exterior range of cells, and the higher set at the opposite side (the left in Fig. 1) acts on the inner surfaces of said cells, it will readily be seen how the entire circumference of each cell will be reached. This arrangement of two sets of scrapers, one acting on the upper half of the cell and the other on the lower half also enables me to shorten the filter as the travel of the scrapers is reduced very materially. By using the jets in connection with the scrapers the sediment deposited on the cells is washed away as soon as loosened; and if the above described operation be performed while the filter is empty, or substantially empty, the lashing effect of the scrapers and jets will be the more effective in displacing the sediment. The scrapers may be run up and down several times if necessary. The sediment being all detached from the cells, the screw is so turned as to run the scrapers up to the normal position seen in Fig. 1, when the liquid will flow in at the ports $c$ under full pressure; an outlet valve at S', in the plate D, is now opened so that the foul and slimy water may escape at this outlet. After the cell walls are thoroughly scraped and rinsed, the valve S', is closed and fresh filtering material or powder supplied, through an inlet at the top of the casing. This charging inlet comprises an exterior cylindrical casing S mounted on the cover D', and containing an inverted thimble, T, of india rubber, with a perforated bottom. Within the thimble is a coil spring $i$, which rests on the cover D' and presses the apertured bottom of the thimble T upward against the cover $j$ of the casing S, thereby forming a hermetic closure. The outlet at S' is provided with a like or similar hermetic closing device to that above described.

As the tendency of the scrapers $d$, used alone, is to press or rub the scum or sediment into the pores of the cell walls, I prefer to provide the filter with a scouring substance of a granular nature, and I employ for this purpose granulated cork, which will, not be acted upon by the water, and which will not sink to the bottom and be carried away with the sediment. The cork is inserted at the inlet S, and collects on the scrapers, applying itself between them and the cell walls as seen in Fig. 6. The particles of cork $d^x$ serve to scour the surfaces of the cells, but they are too soft to do any injury to the latter. The cork will last a considerable time, but may be replenished occasionally. In order to prevent the cork from escaping at the outlet S' when the filter is emptied, a screen $k$ of gauze or perforated material is arranged within the filter and above said outlet.

The flexible branches or forked extremities of the Y-shaped scraper $d$ lap about the cylindrical cells A, and two forks or branches are employed in order that one may be applied to the cells in whichever way the crank P is rotated.

I do not claim broadly the employment of rubbers or scrapers to cleanse the cells of a filter, nor broadly the use of a fibrous filtering substance to form a bed or coating on a perforated filter. In my filter the substance used is rather in the form of dust or powder, and is used in connection with a porous, earthenware cell.

Having thus described my invention, I claim—

1. In a self-cleansing filter, the combination with an inclosing casing and one or more circular series of porous cells arranged therein, of a hollow carrier mounted to rotate concentrically with the series of cells and open to the liquid inlet to the filter, scrapers of flexible material on the hollow branches of said carrier and adapted to scrape the walls of the cells as the carrier rotates, mechanism substantially as described for causing said scrapers to move in a helicoidal path when the carrier rotates, the hollow arms bearing the scrapers having in them jet apertures and granulated cork between the scrapers and the cells, substantially as described.

2. In a self-cleansing filter, the combination with an outer casing and a porous cell arranged therein, of a scraper adapted to be drawn over the surface of said cell, mechanism for operating said scraper, and granulated cork, interposed between the said scraper and the wall of the cell, for scouring the surface of the latter, as set forth.

3. In a filter, the combination with an inclosing casing and a circular series of elongated porous cells arranged therein, of a carrier mounted to rotate concentrically with said series of cells, said carrier having a pendent arm arranged within the circle of cells and another pendent arm arranged without the circle of cells, scrapers secured to said arms, that on one arm being adapted to scrape the lower portions of the cells and that on the other adapted to scrape the upper portions of the cells when the carrier rotates, and mechanism for imparting to said scrapers a helicoidal movement, as set forth.

4. In a filter, the combination with an exterior casing and a circular series of cells A mounted therein, a rotatively mounted carrier in the casing, and scrapers $d$, of soft rubber, secured to the arms of said carrier, said scrapers having a Y-shape, substantially as and for the purposes set forth.

In witness whereof I have hereunto signed my name in the presence of two subscribing witnesses.

OSCAR ANDRÉ.

Witnesses:
ROBT. M. HOOPER,
AUGUSTE MATHIEY.